2,955,075

SYNTHESIS OF STEROIDS BY *CYLINDROCARPON RADICICOLA*

Richard W. Thoma, Somerville, and Josef Fried, New Brunswick, N.J., assignors to Olin Mathieson Chemical Corporation, New York, N.Y., a corporation of Virginia No Drawing. Filed Apr. 15, 1957, Ser. No. 652,654

3 Claims. (Cl. 195—51)

This invention relates to, and has for its object the provision of, a highly advantageous method of producing 9α-halo-11β-hydroxy (or 11-keto)-androstenediones. These steroids are disclosed in a U.S. application of Josef Fried, Serial No. 469,848, filed November 18, 1954.

It has been found that 9α-halo-11β-hydroxy (or 11-keto)-progesterones can be converted to their corresponding 9α-halo-11β-hydroxy (or 11-keto)-androstenediones (e.g., 9α-fluoro-$\Delta^4$-androstene-11β-ol-3,17-dione) by subjecting these progesterones to the action of enzymes of *Cylindrocarpon radicicola*. The action of the enzymes can be utilized either by bringing together, in an aqueous nutrient medium, the steroid, oxygen and enzymes of non-proliferating cells of *Cylindrocarpon radicicola*, or (preferably) by including the steroid in an aerated culture of the microorganism.

In general, the conditions of culturing *Cylindrocarpon radicicola* for the purposes of this invention are (except for the inclusion of the steroid to be oxidized) the same as those of culturing fungi for the production of antibiotics or organic acids; thus, *Cylindrocarpon radicicola* is grown in contact with (in or on) a suitable nutrient medium in the presence of oxygen (air). A suitable nutrient medium essentially comprises a source of nitrogenous factors and an assimilable source of carbon and energy. The latter may be a carbohydrate (such as sucrose, molasses, glucose, maltose, starch or dextrin) and/or the steroid itself. Preferably, however, the medium includes an assimilable source of carbon and energy in addition to the steroid.

The source of nitrogenous factors may be organic (e.g., soybean meal, corn steep liquor, meat extract, distillers solubles, peptones and/or yeast extract) or synthetic (i.e., composed of simple, synthesizable organic and inorganic compounds such as ammonium salts, alkali nitrates, amino acids or urea).

Among the 9α-halo-11β-hydroxy (or 11-keto)-progesterones which may be converted into useful androstene derivatives by the practice of this invention may be mentioned the 9α-halo-11β-hydroxyprogesterones (e.g., 9α-fluoro-11β-hydroxyprogesterone) and the 9α-halo-11-ketoprogesterones (e.g., 9α-fluoro-11-ketoprogesterone).

The following examples are illustrative of the invention (all temperatures being in centigrade):

EXAMPLE 1

9α-fluoro-11β-hydroxyandrostenedione (a) *Fermentation.*—Surface growth from a two-week-old agar slant (prepared from dextrose, 40 g.; neopeptone, 10 g.; agar, 15 g.; and distilled water to make one liter) culture of *Cylindrocarpon radicicola* A.T.C.C. No. 11,011 (obtainable from the American Type Culture Collection, Washington, D.C.), is washed off with 5 ml. of aqueous 0.01% Duponol (a wetting agent). Aliquots of the suspension are transferred to five 250-ml. conical flasks, each containing 50 ml. of the following medium (A):

| | G. |
|---|---|
| Dextrose | 10 |
| Corn steep liquor | 6 |
| $NH_4H_2PO_4$ | 3 |
| $CaCO_3$ | 2.5 |
| Yeast extract | 2.5 |
| Soybean oil | 2.2 |

Distilled water to one liter.

Adjusted to pH 7.0 and sterilized for 30 min. at 120°.

The flasks so inoculated are incubated at 25° with rotary mechanical shaking in a circle of radius 2 inches at 280 r.p.m. After 66 hours, a 10% (vol./vol.) transfer is made to 38 flasks of the same medium A. Incubation of the second flask stage is as with the first. After 47 hours, 475 mg. of 9α-fluoro-11β-hydroxyprogesterone is added in 19 ml. of methanolic solution (0.5 ml. per flask). Forty-eight hours after the steroid is added, the contents of the flasks are filtered and flasks and pad are washed. The volume of filtrate including wash is 2000 ml.

(b) *Isolation of 9α-fluoro-11β-hydroxyandrostenedione.*—The culture filtrate is extracted with three 700 ml. portions of chloroform and the combined extracts evaporated to dryness in vacuo. The crystalline residue is triturated with acetone and the resulting crystals recrystallized from acetone. Pure 9α-fluoro-11β-hydroxyandrostenedione is obtained which has the following properties, identical with those of an authentic sample: M.P. about 260–262°; $[\alpha]_D^{23}$ +177° (c., 0.49 in $CHCl_3$);

$\lambda_{max.}^{alc.}$ 237mμ (ε=17,100); $\lambda_{max.}^{Nujol}$ 3.04, 5.76, 6.11μ

*Analysis.*—Calcd. for $C_{19}H_{25}O_3F$ (320.39): C, 71.22; H, 7.86. Found: C, 71.54; H, 7.82.

In a similar manner, by substituting 9α-chloro-11β-hydroxyprogesterone or 9α-bromo-11β-hydroxyprogesterone for the 9α-fluoro-11β-hydroxyprogesterone in the procedure of Example 1, 9α-chloro-11β-hydroxyandrostenedione and 9α-bromo-11β-hydroxyandrostenedione are obtained, respectively.

EXAMPLE 2

9α-fluoro-11-ketoandrostenedione

Following the procedure of Example 1, but substituting 475 mg. of 9α-fluoro-11-ketoprogesterone for the 9α-fluoro-11β-hydroxyprogesterone, there is obtained 9α-fluoro-11-ketoandrostenedione.

Similarly, 9α-chloro-11-ketoprogesterone and 9α-bromo-11-keto-progesterone can be converted to 9α-chloro-11-ketoandrostenedione and 9α-bromo-11-ketoandrostenedione, respectively.

The invention may be otherwise variously embodied within the scope of the appended claims.

We claim:

1. A process for preparing a compound selected from the group consisting of 9α-halo-11β-hydroxyandrostenedione and 9α-halo-11-ketoandrostenedione, which comprises subjecting a steroid selected from the group consisting of 9α-halo-11β-hydroxyprogesterone and 9α-halo-11-ketoprogesterone to the actions of enzymes of *Cylindrocarpon radicicola* in the presence of oxygen and recovering the resulting androstenedione.

2. The process of claim 1, wherein the steroid reactant is 9α-fluoro-11β-hydroxyprogesterone.

3. The process of claim 1, wherein the steroid reactant is 9α-fluoro-11-ketoprogesterone.

References Cited in the file of this patent

UNITED STATES PATENTS

| 2,721,828 | Murray et al. | Oct. 25, 1955 |
| 2,744,120 | Fried et al. | May 1, 1956 |

OTHER REFERENCES

Peterson et al.: "J.A.C.S.," vol. 75 (1953), p. 5768.
Fried et al.: "J.A.C.S.," vol. 75 (1953), pp. 5764 and 5765.
Vischer et al.: Experiemtia, IX. 10, 1953, pp. 371–372.